Patented June 9, 1953

2,641,614

UNITED STATES PATENT OFFICE 2,641,614

CONDENSATION PRODUCTS OF STYRENE OXIDE WITH ALKYLENE OXIDES AND METHOD OF MAKING THE SAME

Edgar C. Britton and Peter S. Petrie, Midland, Mich., assignors to The Dow Chemical Company, Midland, Mich., a corporation of Delaware No Drawing. Application January 2, 1951, Serial No. 204,082

8 Claims. (Cl. 260—611)

This invention concerns new compositions which are complex mixtures of polyglycols or diols. It pertains more particularly to mixtures of polyglycols which are condensation products of styrene oxide with one or more lower alkylene oxides and relates to a method of making the same.

The new compositions are complex mixtures of linear polyglycols or diols in which the polyoxyalkylene chains contain both the phenyl substituted oxyethylene group (—$C_6H_5.C_2H_3O$—), and one or more lower oxyalkylene groups having the general formula ($C_nH_{2n}O$) such as an oxyethylene group (—$C_2H_4O$—), or an oxy-1,2-propylene group (—$CH_3.C_2H_3O$—), chemically combined with each other in the same molecule. Such polyglycols or diols having a relatively high average molecular weight may be obtained by reaction of styrene oxide with a lower alkylene oxide such as ethylene oxide or 1,2-propylene oxide, or by reaction of a mixture consisting of styrene oxide, ethylene oxide and 1,2-propylene oxide, in the presence of a small amount of a glycol, e. g. from 1 to 10 per cent by weight, of ethylene glycol, 1,2-propylene glycol, or styrene glycol, as starting material, and a strongly alkaline catalyst such as sodium hydroxide or potassium hydroxide.

The new compositions are viscous liquid to semi-solid amorphous substances at ordinary temperatures. They are soluble in aromatic hydrocarbon solvents such as benzene, toluene, xylene, ethylbenzene and isopropylbenzene, but are insoluble in lower aliphatic hydrocarbons, e. g. normal heptane. The compositions or mixtures of diols vary widely with regard to their solubility in water, being soluble to slightly soluble, or insoluble in water, depending for the most part upon the relative proportion of the styrene oxide to ethylene oxide in the diol molecule. Accordingly, the new polyglycol compositions are suitable for a number of purposes. They are compatible with synthetic thermoplastic resins such as polystyrene, or ethylcellulose, and may be incorporated therewith as plasticizers, lubricants, or mold release agents. Certain of the new compositions, particularly the water soluble mixtures of diols, i. e. those containing a relatively large proportion of ethylene oxide chemically combined with the styrene oxide, e. g. in amount corresponding to about nine molecular proportions of ethylene oxide per molecular equivalent proportion of the styrene oxide, are useful as emulsifying or dispersing agents.

The styrene oxide may be employed in any desired proportions of from 0.1 to 9 molecular proportions of the styrene oxide per molecular equivalent proportion of the alkylene oxide, or alkylene oxides, in the reaction mixture.

Ethylene oxide and 1,2-propylene oxide are the preferred alkylene oxides, although other lower alkylene oxides such as isobutylene oxide, or 1,2-butylene oxide, may also be used.

Any glycol, or aliphatic diol, such as ethylene glycol, 1,2-propylene glycol, styrene glycol, butylene glycol, dipropylene glycol, triethylene glycol, tripropylene glycol, or 1,3-propylene glycol, or a mixture of two or more of such glycols, may be used in the reaction, but ethylene glycol, 1,2-propylene glycol, or styrene glycol, are preferably employed in order to avoid the formation of products containing oxyalkylene groups in the molecule different from those of the preferred principal reactants. The glycol starting material is usually employed in amounts corresponding to from 1 to 10 per cent, preferably from 1 to 5 per cent by weight, based on the sum of the weights of the styrene oxide and the alkylene oxide used as reactants, although somewhat greater proportions of the starting glycol may be used. Water in an amount sufficient to react with a minor amount of the styrene oxide, or the alkylene oxide, and form a corresponding amount of a glycol starting material may also be employed in the reaction. In general, the average molecular weight of the polymeric composition or the condensation product obtained is dependent for the most part upon the proportion of the glycol starting material employed relative to the combined weight of the styrene oxide and the alkylene oxide reactants used. Within the limits stated, a relatively large proportion, e. g. 10 per cent by weight, of a glycol starting material usually results in the formation of polymeric compositions having a lower average molecular weight for a given amount of the styrene oxide and the alkylene oxide reactants than is obtained by an amount of the glycol starting material corresponding to from 1 to 5 per cent by weight of the oxide reactants.

As the strongly alkaline catalyst sodium hydroxide or potassium hydroxide is preferred, in amount corresponding to from 0.1 to 0.5 per cent by weight of the reactants, although somewhat larger amounts of the catalyst may be used. The alkali catalyst may conveniently be added to the reactants by dissolving the same in a glycol, e. g. 1,2-propylene glycol, and mixing a suitable amount of the solution with the organic oxide reactants as both catalyst and glycol starting material.

The addition reaction may be carried out at temperatures between 80° and 200° C., but is preferably carried out at temperatures of from 100° to 160° C., and at the autogenous pressure, or above. The reaction may be carried out by charging a mixture of the ingredients, in the desired proportions, into a pressure vessel and heating the mixture at the reaction temperature until an appreciable drop in pressure is obtained, or until no further lowering of pressure is observed. The compositions may also be obtained by feeding the styrene oxide and one or more of the lower alkylene oxides, preferably ethylene oxide or 1,2-propylene oxide, in the desired proportions, into admixture with each other and with the glycol starting material and catalyst, e. g. a mixture of 1,2-propylene glycol and potassium hydroxide, in a pressure vessel while agitating and maintaining the mixture at a reaction temperature.

In a preferred practice, the starting ingredients, i. e. the styrene oxide, the alkylene oxide, or oxides, the glycol starting material and the catalyst, are mixed together in the desired proportions, and fed, at a superatmospheric pressure sufficient to maintain the reactants in a liquid or co-dissolved form, through a tubular reactor. The mixture is heated at a reaction temperature for a time sufficient to complete, or substantially complete, the reaction. The contact time, i. e. the time required for an infinitesimal portion of the mixture to traverse the length of the tube, can readily be controlled by regulating the rate of flow into and from the heated tube by means of a metering pump or in other usual ways, e. g. by means of a flow regulating valve. The reaction is usually complete in from 2 to 4 hours at reaction temperatures between 140° and 160° C. A pressure of from 220 to 250 pounds per square inch, gauge, is usually satisfactory to maintain the reactants in liquid phase at such temperatures, although higher pressures may be used.

Upon completion of the reaction, the sodium hydroxide, or potassium hydroxide, used as the catalyst, is neutralized by treating the reaction product with carbon dioxide, or with an acid such as sulfuric acid, or hydrochloric acid, which will react with the catalyst to form a salt that can readily be removed from the reaction product. The inorganic acids are preferably used in aqueous solution. After neutralizing the catalyst, the product is vacuum-stripped, or devolatilized, by heating the same to an elevated temperature at subatmospheric pressure to separate unreacted components and water, together with other volatile ingredients from the product. The product is filtered, preferably while hot, to remove insoluble substances, e. g. salts of the catalyst and the neutralizing agent. The product may advantageously be treated with a decolorizing agent such as "Darco" or "Norit," i. e. finely divided charcoal, prior to filtering the same to improve the color.

In accordance with the procedure just described we have prepared new compositions or addition products which are complex mixtures of polyglycols having average molecular weights of from 480 to 2000 from mixtures of styrene oxide and one or more alkylene oxides, e. g. ethylene oxide and 1,2-propylene oxide.

The new compositions tend to deteriorate upon exposure to air at temperatures of about 100° C. or above, apparently by breakdown of the polymer molecules and vaporization of the fragments. Such tendency to deteriorate may be counteracted by the addition of small amounts of compounds falling within the general class of antioxidants, particularly compounds employed as antioxidants for synthetic and natural rubber. Examples of compounds which are suitable are catechol, tertiary-butylcatechol, hydroquinone monobenzyl ether, N - phenyl - beta-naphthylamine, bis-(4 aminophenyl) dimethyl methane, 1,1-di-(4-hydroxyphenyl) cyclohexane and bis-(4-hydroxyphenyl) dimethyl methane. In general, an amount of the antioxidant corresponding to from 1 to 2 per cent by weight of the polymeric composition is satisfactory.

The following examples illustrate ways in which the principle of the invention has been applied, but are not to be construed as limiting the invention.

Example 1

A mixture consisting of 540 grams (4.5 moles) of styrene oxide and 29 grams (0.5 mole) of 1,2-propylene oxide, together with 10 grams of 1,2-propylene glycol and 1.3 grams of sodium hydroxide as starting material and catalyst, respectively, was sealed in a closed pressure resistant vessel. The mixture was agitated and heated to a temperature of 130° C. over a period of 6 hours. Thereafter, the mixture was cooled to about 100° C., treated with carbon dioxide gas to neutralize the sodium hydroxide and was filtered to separate insoluble substances. The filtered product was heated to a temperature of 150° C. at 4 millimeters absolute pressure for a period of about one hour to separate volatile ingredients, then cooled. Sixty-five grams of styrene oxide were recovered. The product weighed 455 grams. It was a semi-solid material. The product was soluble in benzene, but insoluble in normal heptane or water. The product was found to have a viscosity of 3,100 centipoises at 100° C. It had an average molecular weight of 730 by freezing point lowering of benzene. Eighty parts by weight of a molding grade polystyrene was heat-plastified on compounding rolls and mixed with 20 parts of the condensation product to form a homogeneous composition. It was extruded as a transparent rod.

Example 2

A mixture consisting of 540 grams (4.5 moles) of styrene oxide and 23 grams (0.5 mole) of ethylene oxide, together with 10 grams of ethylene glycol and 1.3 grams of sodium hydroxide, as starting material and catalyst, respectively, was reacted by procedure similar to that described in Example 1. The procedure for recovering the product was the same as that described in the preceding example. There was obtained 488 grams of a viscous oil. It was insoluble in water. The product had a viscosity of 200 centipoises at 100° C. and an average molecular weight of 480.

Example 3

A solution of 1040 grams (8.7 moles) of styrene oxide, 382 grams (8.7 moles) of ethylene oxide, 30 grams of styrene glycol and 2.5 grams of potassium hydroxide was prepared by mixing the ingredients in a closed container. The solution was fed in continuous manner through a tubular metal coil reactor wherein it was heated to temperatures between 155° and 160° C. under a pressure of from 225 to 250 pounds per square inch, gauge, for a contact time of 4 hours. By contact time is meant the time for an infinitesimal portion of the reaction mixture to traverse the length of the tube. The effluent liquid was cooled to about 100° C., treated with carbon dioxide gas to neutralize the potassium hydroxide and was filtered to separate insoluble substances. The filtered liquid was heated to a temperature of 150° C. at 4 millimeters absolute pressure for a period of about one hour to remove volatile ingredients, then cooled. There was obtained 1235 grams of product. It was a viscous brown oil. The product had a viscosity of 400 centipoises at 100° C. It had an average molecular weight of 630 by freezing point lowering of benzene.

Example 4

A solution of 360 grams (3.0 moles) of styrene oxide, 1188 grams (27.0 moles) of ethylene oxide, 30 grams of styrene glycol and 2.5 grams of potassium hydroxide, was polymerized by procedure similar to that described in Example 3, except that the reaction time was 2 hours. Volatile ingredients were separated from the oil by heating the reaction product to a temperature of 150° C. at 4 millimeters pressure over a period of one hour. There were obtained 65 grams (1.5 moles) of ethylene oxide, 32 grams (0.27 mole) of styrene oxide and 1322 grams of liquid residue or product. The product was a brown oil. It had an average molecular weight of 2000, and a viscosity of 70 centipoises at 100° C. The product was soluble in water, methyl alcohol and benzene. It was insoluble in normal heptane.

Example 5

A mixture consisting of 210 grams (1.7 moles) of styrene oxide, 100 grams (1.7 moles) of 1,2-propylene oxide, 12 grams of 1,2-propylene glycol and 0.65 gram of solid sodium hydroxide was sealed in a pressure resistant vessel. The mixture was agitated and heated to temperatures of from 125° to 135° C. over a period of 6 hours. The mixture was removed from the vessel, neutralized with an aqueous 6 normal solution of hydrochloric acid and heated to a temperature of 200° C. at 5 millimeters absolute pressure over a period of one hour to separate volatile ingredients. The liquid residue was cooled to about 100° C., treated with a decolorizing charcoal and was filtered while hot. There was obtained 244 grams of liquid product. It was a clear amber viscous liquid at room temperature. The product had a refractive index $n_D^{25}=1.5354$ and an average molecular weight of 880.

Example 6

A weighed portion of the liquid product of Example 5 was mixed with 2 per cent by weight of tertiary-butyl-catechol. The mixture was placed in a 4 inch diameter Petri dish and heated to a temperature of 100° C. in an air oven over a period of 100 hours, then cooled and reweighed. The loss in weight was 2.5 per cent of the original weight of the mixture. A similar portion of the product was heated to a temperature of 100° C. for 100 hours in the absence of an antioxidant. The loss in weight was 22 per cent.

Example 7

A mixture consisting of 8.4 grams (0.07 mole) of styrene oxide, 12 grams (0.21 mole) of 1,2-propylene oxide, together with 1 cc. of a solution consisting of 56.1 grams of potassium hydroxide dissolved in sufficient 1,2-propylene glycol to make 1000 cc. of solution, i. e. a normal solution, was sealed in a glass tube and heated to a temperature of 125° C. over a period of 2 hours. The procedure for recovering the product was the same as that described in Example 5. The product was a yellow viscous liquid having a viscosity of 2400 centipoises at 25° C. It had an average molecular weight of 940.

Example 8

A mixture consisting of 540 grams (4.5 moles) of styrene oxide, 11 grams (0.25 mole) of ethylene oxide 15 grams (0.25 mole) of 1,2-propylene oxide, 5 grams of ethylene glycol, 5 grams of 1,2-propylene glycol and 1.2 grams of potassium hydroxide as catalyst, was polymerized by heating the same in a closed vessel to a temperature of 130° C. over a period of 6 hours. The mixture was agitated during the reaction period. Thereafter, the mixture was neutralized with an aqueous 10 weight per cent solution of sulfuric acid and was filtered while hot to remove insoluble substances. The filtered material was heated to a temperature of 170° C., at 4 millimeters absolute pressure, over a period of one hour to remove volatile ingredients, then cooled. The product consisted of 570 grams of a semi-solid material. The product was soluble in benzene and had an average molecular weight of 1300. It had a viscosity of 2100 centipoises at 100° C.

Example 9

A mixture consisting of 360 grams (3.0 moles) of styrene oxide, 66 grams (1.5 moles) of ethylene oxide, 87 grams (1.5 moles) of 1,2-propylene oxide, 5 grams of ethylene glycol, 5 grams of 1,2-propylene glycol and 1.2 grams of potassium hydroxide as catalyst, was sealed in a closed vessel. The mixture was agitated and heated to a temperature of 90° C. Thereafter, the temperature of the mixture was gradually increased to 140° C. over a period of 6 hours. The mixture was cooled to about 90° C., neutralized with dilute sulfuric acid solution as in Example 8 and was filtered while hot to remove insoluble substances. The filtered material was heated to a temperature of 160° C., at 4 millimeters absolute pressure for a period of one hour to remove volatile ingredients, then cooled. There was obtained 506 grams of a viscous oil. It was insoluble in water and normal heptane, but was soluble in benzene. The product had an average molecular weight of 1370 by freezing point lowering of benzene. It had an absolute viscosity of 200 centipoises at 100° C.

Example 10

A solution consisting of 360 grams (3.0 moles) of styrene oxide, 594 grams (13.5 moles) of ethylene oxide, 784 grams (13.5 moles) of 1,2-propylene oxide, 60 grams of styrene glycol, and 5 grams of potassium hydroxide was prepared by mixing the ingredients together in a closed container. The solution was passed in continuous manner through a heated tube wherein it was heated to a temperature of from 155° to 160° C. for a contact time of about 5 hours at a pressure of 225 pounds per square inch, gauge, pressure. By contact time is meant the time for an infinitesimal portion of the solution to traverse the length of the heated tube. The product was neutralized with a dilute aqueous solution of sulfuric acid and was filtered to separate insoluble substances. The filtered material was heated to a temperature of 160° C. at 5 millimeters pressure over a period of about 2 hours to remove volatile substances. There was obtained 1624 grams of a viscous oil. It was soluble in benzene and methyl alcohol, but was insoluble in normal heptane. It was slightly soluble in water. The product had an average molecular weight of 1150. It had a viscosity of 25 centipoises at 100° C.

Other modes of applying the principle of the invention may be used instead of those explained, change being made as regards the compounds or steps herein employed, provided the compounds or steps stated in any of the following claims, or the equivalent of such compounds or steps, be employed.

We claim:

1. A polymeric composition comprising a mixture of interpolymers of styrene oxide and at least one alkylene oxide containing from 2 to 4 carbon atoms in the molecule, which mixture of interpolymers has an average molecular weight of at least 300, and in which mixture of interpolymers the styrene oxide and the alkylene oxide are chemically combined in amounts corresponding to from 0.1 to 9 molecular proportions of the styrene oxide per molecular equivalent proportion of the alkylene oxide.

2. A polymeric composition comprising a mixture of interpolymers of styrene oxide, ethylene oxide and 1,2-propylene oxide, which mixture of interpolymers has an average molecular weight of at least 300, and in which mixture of interpolymers the styrene oxide, the ethylene oxide and the 1,2-propylene oxide are chemically combined in amounts corresponding to from 0.1 to 9 molecular proportions of the styrene oxide per molecular equivalent proportion of the sum of the ethylene oxide and the 1,2-propylene oxide.

3. A polymeric composition comprising a mixture of interpolymers of styrene oxide and ethylene oxide, which mixture of interpolymers has an average molecular weight of at least 300, and in which mixture of interpolymers the styrene oxide and the ethylene oxide are chemically combined in amounts corresponding to from 0.1 to 9 molecular proportions of the styrene oxide per molecular equivalent proportion of the ethylene oxide.

4. A polymeric composition comprising a mixture of interpolymers of styrene oxide and 1,2-propylene oxide, which mixture of interpolymers has an average molecular weight of at least 300, and in which mixture of interpolymers the styrene oxide and the 1,2-propylene oxide are chemically combined in amounts corresponding to from 0.1 to 9 molecular proportions of the styrene oxide per molecular equivalent proportion of the 1,2-propylene oxide.

5. A method of making a polymeric composition consisting of a mixture of polyglycols having an average molecular weight of at least 300, which comprises interpolymerizing a mixture consisting of styrene oxide and at least one alkylene oxide containing from 2 to 4 carbon atoms in the molecule, in amounts corresponding to from 0.1 to 9 molecular proportions of the styrene oxide per molecular equivalent proportion of the alkylene oxide, by heating the oxide reactants in liquid phase while in admixture with from 1 to 10 per cent by weight of a glycol and from 0.1 to 0.5 per cent of an alkali metal hydroxide to a reaction temperature between 80° and 200° C. at superatmospheric pressure.

6. A method of making a polymeric composition consisting of a mixture of linear polyglycols having an average molecular weight of at least 300, which comprises interpolymerizing a mixture consisting of styrene oxide, ethylene oxide and 1,2-propylene oxide, in amounts corresponding to from 0.1 to 9 molecular proportions of the styrene oxide per molecular equivalent proportion of the sum of the ethylene and 1,2-propylene oxides, by heating the oxide reactants in liquid phase while in admixture with from 0.1 to 0.5 per cent of an alkali metal hydroxide as catalyst, to a reaction temperature between 100° and 160° C. at superatmospheric pressure.

7. A method of making a polymeric composition consisting of a mixture of linear polyglycols having an average molecular weight of at least 300, which comprises interpolymerizing a mixture consisting of styrene oxide and ethylene oxide in amounts corresponding to from 0.1 to 9 molecular proportions of the styrene oxide per molecular equivalent proportion of the ethylene oxide, by heating the reactants in admixture with from 0.1 to 10 per cent by weight of a glycol starting material and from 0.1 to 0.5 per cent of an alkali metal hydroxide as catalyst, to a reaction temperature between 100° and 160° C. at superatmospheric pressure.

8. A method of making a polymeric composition consisting of a mixture of linear polyglycols having an average molecular weight of at least 300, which comprises interpolymerizing a mixture consisting of styrene oxide and 1,2-propylene oxide in amounts corresponding to from 0.1 to 9 molecular proportions of the styrene oxide per molecular equivalent proportion of the 1,2-propylene oxide, by heating the reactants in admixture with from 0.1 to 10 per cent by weight of a glycol starting material and from 0.1 to 0.5 per cent of an alkali metal hydroxide as catalyst, to a reaction temperature between 100° and 160° C. at superatmospheric pressure.

EDGAR C. BRITTON.
PETER S. PETRIE.

References Cited in the file of this patent

UNITED STATES PATENTS

| Number | Name | Date |
| --- | --- | --- |
| 2,372,615 | Thomas et al. | Mar. 27, 1945 |
| 2,425,845 | Toussaint et al. | Aug. 19, 1947 |